(12) United States Patent
Tabata et al.

(10) Patent No.: US 12,485,976 B2
(45) Date of Patent: Dec. 2, 2025

(54) WORK VEHICLE

(71) Applicant: Kubota Corporation, Osaka (JP)

(72) Inventors: Shinya Tabata, Sakai (JP); Yuki Monde, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/966,823

(22) Filed: Dec. 3, 2024

(65) Prior Publication Data

US 2025/0313282 A1    Oct. 9, 2025

(30) Foreign Application Priority Data

Apr. 3, 2024    (JP) ................. 2024-060013

(51) Int. Cl.
  *B62D 33/06*    (2006.01)
  *B60R 21/13*    (2006.01)
  *B62D 25/20*    (2006.01)
  *B62D 63/04*    (2006.01)

(52) U.S. Cl.
  CPC .......... *B62D 33/0617* (2013.01); *B60R 21/13* (2013.01); *B62D 25/2018* (2013.01); *B62D 63/04* (2013.01)

(58) Field of Classification Search
  CPC ............ B62D 33/0617; B62D 25/2018; B62D 63/04; B60R 21/13
  See application file for complete search history.

(56) References Cited

U.S. PATENT DOCUMENTS

2009/0302590 A1*  12/2009  Van Bronkhorst .. B60G 15/063
                                                280/756

FOREIGN PATENT DOCUMENTS

CA         3044749 A1 *  11/2019  ......... B60G 17/0163
JP         201211800 A      1/2012

* cited by examiner

*Primary Examiner* — Paul N Dickson
*Assistant Examiner* — Matthew Joseph Ganci
(74) *Attorney, Agent, or Firm* — The Webb Law Firm (57) ABSTRACT

A work vehicle includes a steering wheel attached to a support frame including a first lateral frame member positioned above a lower portion of a body, extending laterally, and coupled to right and left sections of the body; a second lateral frame member positioned above the first lateral frame member, extending laterally, and coupled to the right and left sections of the body; and a first vertical frame member extending vertically and coupled to the first lateral frame member and the second lateral frame member.

10 Claims, 5 Drawing Sheets

WORK VEHICLE

CROSS-REFERENCE TO RELATED APPLICATION

This application claims priority to Japanese Patent Application No. 2024-060013 filed Apr. 3, 2024, the disclosure of which is hereby incorporated by reference in its entirety.

BACKGROUND OF THE INVENTION

Field of the Invention

The present invention relates to a work vehicle including a firmly supported steering wheel operable by a driver on the driver's seat.

Description of Related Art

A multipurpose work vehicle as an example work vehicle may, as disclosed in Japanese Unexamined Patent Application Publication, Tokukai, No. 2012-11800, include a steering wheel attached to a body frame (that is, a part of the body) forward of the driver's seat for use to steer the work vehicle.

A work vehicle should preferably have large legroom in a front-lower direction from the driver's seat and the passenger's seat to improve comfortability for the driver on the driver's seat and the passenger on the passenger's seat.

Utility vehicles such as that disclosed in Japanese Unexamined Patent Application Publication, Tokukai, No. 2012-11800 often travel on a rough or mountainous ground, and may be shaken strongly while traveling. The driver may thus hold the steering wheel strongly to support their body. The steering wheel should preferably be supported firmly.

SUMMARY OF THE INVENTION

The present invention has an object of providing a work vehicle having large legroom for the driver and the passenger and including a firmly supported steering wheel.

A work vehicle according to the present invention includes: a body; a travel device attached to and supporting the body; a driver's seat on the body; a passenger's seat on the body and lateral to the driver's seat; a steering wheel manually operable by a driver on the driver's seat to steer the work vehicle; and a support frame positioned above a lower portion of the body, extending laterally, and coupled to a pair of right and left sections of the body which right and left sections are forward of the driver's seat and the passenger's seat, the steering wheel being attached to the support frame, the support frame including: a first lateral frame member positioned above the lower portion of the body, extending laterally, and coupled to the right and left sections of the body; a second lateral frame member positioned above the first lateral frame member, extending laterally, and coupled to the right and left sections of the body; and a first vertical frame member extending vertically and coupled to the first lateral frame member and the second lateral frame member.

The above work vehicle includes a support frame coupled to right and left sections of the body and positioned forward of the driver's seat and the passenger's seat. The steering wheel is attached to the support frame.

The support frame includes first and second lateral frame members each coupled to the right and left sections of the body and a first vertical frame member coupled to the first and second lateral frame members.

The support frame, which supports the steering wheel, is positioned above a lower portion of the body and coupled to the right and left sections of the body. This ensures large legroom between the lower portion of the body and the support frame, thereby improving comfortability for the driver and the passenger.

The support frame, which is coupled to the right and left sections of the body, firmly supports the steering wheel. When the driver holds the steering wheel strongly to support their body, the steering wheel reliably supports the body of the driver.

The work vehicle may preferably be further configured such that the first vertical frame member is forward of the driver's seat, and the steering wheel is attached to the first vertical frame member.

The above work vehicle includes a first vertical frame member at a portion of the support frame which portion is forward of the driver's seat. The steering wheel is attached to the first vertical frame member.

This allows a load on the steering wheel to be supported by both the first and second lateral frame members with the first vertical frame member in-between, thereby supporting the steering wheel more firmly.

The first vertical frame member extends vertically. The steering wheel is easily attachable to the first vertical frame member at a height appropriate for the driver's seat.

The work vehicle may preferably be further configured such that the work vehicle further includes a third lateral frame member forward of the driver's seat and the passenger's seat relative to the body, extending laterally, and coupled to the first vertical frame member and that one of the right and left sections of the body which faces the passenger's seat.

The above work vehicle includes a first vertical frame member at a portion of the support frame which portion is forward of the driver's seat. The steering wheel is attached to the first vertical frame member.

This allows a load on the steering wheel to be supported by both the first and second lateral frame members with the first vertical frame member in-between, thereby supporting the steering wheel more firmly.

The first vertical frame member extends vertically. The steering wheel is easily attachable to the first vertical frame member at a height appropriate for the driver's seat.

For instance, with the driver's seat (or the first vertical frame member) to the left and the passenger's seat to the right, the first vertical frame member is relatively far from a right portion of the body. With the driver's seat (or the first vertical frame member) to the right and the passenger's seat to the left, the first vertical frame member is relatively far from a left portion of the body.

The above work vehicle includes a third lateral frame member coupled to the first vertical frame member and a right (or left) portion of the body which portion faces the passenger's seat to allow the support frame to be coupled to the body more strongly, thereby supporting the steering wheel more firmly.

The work vehicle may preferably be further configured such that the third lateral frame member is above the first lateral frame member and below the second lateral frame member.

With the above configuration, the third lateral frame member is between the first lateral frame member below and the second lateral frame member above in a rear view. The third lateral frame member is thus coupled to a right (or left) portion of the body at a position far from the position at which the first and second lateral frame members are each coupled to the right (or left) portion of the body.

With the above configuration, the first to third lateral frame members are coupled to the right (or left) portion of the body at respective positions far from one another to allow the support frame to be coupled to the body more strongly, thereby supporting the steering wheel more firmly.

The work vehicle may preferably be further configured such that the second lateral frame member is forward of the first lateral frame member, the first vertical frame member includes: a lower section extending vertically and having a lower portion coupled to the first lateral frame member; and an upper section extending in a front-back direction and having a front portion coupled to the second lateral frame member, and the lower section has an upper portion coupled to a back portion of the upper section.

With the above configuration, the second lateral frame member above is forward of the first lateral frame member below.

This ensures a large space between the first lateral frame member and a lower portion of the body in a rear view as well as forward of the first lateral frame member (that is, below the second lateral frame member). The above configuration thereby reliably ensures large legroom, thereby improving comfortability for the driver and the passenger.

With the above configuration, the first vertical frame member includes a vertical lower section and a longitudinal upper section having an upper portion coupled to a back portion of the upper section. The lower section has a lower portion coupled to the first vertical frame member. The upper section has a front portion coupled to the second lateral frame member.

This allows the first vertical frame member to be easily coupled to the first and second lateral frame members even if the second lateral frame member above is forward of the first lateral frame member below.

The work vehicle may preferably be further configured such that the first vertical frame member is forward of the driver's seat, and the steering wheel is attached to the lower section.

The above work vehicle includes a first vertical frame member at a portion of the support frame which portion is forward of the driver's seat. The steering wheel is attached to the lower section of the first vertical frame member.

This allows a load on the steering wheel to be supported by both the first and second lateral frame members with the first vertical frame member in-between, thereby supporting the steering wheel more firmly.

The lower section extends vertically. The steering wheel is easily attachable to the lower section at a height appropriate for the driver's seat.

The work vehicle may preferably be further configured such that the body includes: a floor frame at a lower portion of the body; and a roll-over protective structure frame coupled to the floor frame and covering the driver's seat and the passenger's seat, the first lateral frame member is positioned above the floor frame, extends laterally, and is coupled to a pair of right and left sections of the roll-over protective structure frame which right and left sections are forward of the driver's seat and the passenger's seat, and the second lateral frame member is positioned above the first lateral frame member, extends laterally, and is coupled to the right and left sections of the roll-over protective structure frame.

A work vehicle may be configured such that the body includes a floor frame at a lower portion of the body and a sufficiently firm roll-over protective structure frame coupled to the floor frame and covering the driver's seat and the passenger's seat.

With the above configuration, the first and second lateral frame members are each coupled to right and left sections of the roll-over protective structure frame to allow the support frame to support the roll-over protective structure frame sufficiently firmly, thereby supporting the steering wheel more firmly.

The work vehicle may preferably be further configured such that the body includes a floor frame at a lower portion of the body, and the work vehicle further includes a second vertical frame member extending vertically and coupled to the second lateral frame member and the floor frame.

The above work vehicle includes a second vertical frame member coupled to the second lateral frame member and the floor frame to allow the support frame to be coupled to the body more strongly, thereby supporting the steering wheel more firmly.

The work vehicle may preferably be further configured such that the second vertical frame member is forward of the first lateral frame member, and the work vehicle further includes a longitudinal frame member extending in a front-back direction and coupled to the first lateral frame member and the second vertical frame member.

With the above configuration, the second vertical frame member is forward of the first lateral frame member, which is at a lower portion of the support frame.

This allows the second vertical frame member to be forward of the legroom between the floor frame and the support frame. The above configuration thereby reliably ensures large legroom, thereby improving comfortability for the driver and the passenger.

The above work vehicle includes a longitudinal frame member coupled to the first lateral frame member, which is at a lower portion of the support frame, and the second vertical frame member to allow the support frame to be coupled to the body more strongly, thereby supporting the steering wheel more firmly.

DESCRIPTION OF THE INVENTION

FIGS. 1 to 5 illustrate a utility vehicle as an example work vehicle. FIGS. 1 to 5 show arrow F to indicate the forward direction, arrow B to indicate the backward direction, arrow U to indicate the upward direction, arrow D to indicate the downward direction, arrow L to indicate the leftward direction, and arrow R to indicate the rightward direction.

Overall Configuration of Work Vehicle

Figure 1:
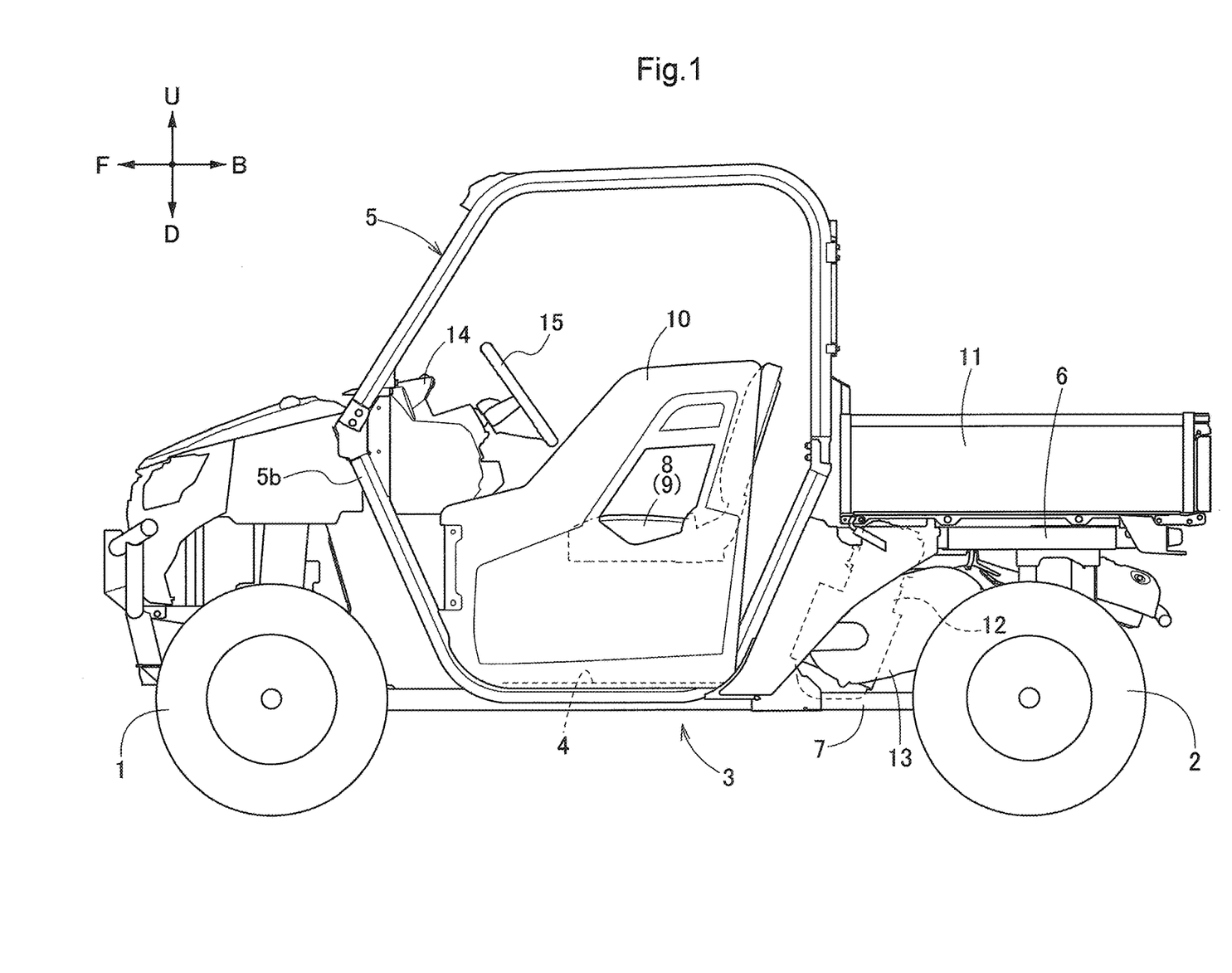
FIG. 1 is a left side view of a work vehicle.
Figure 2:
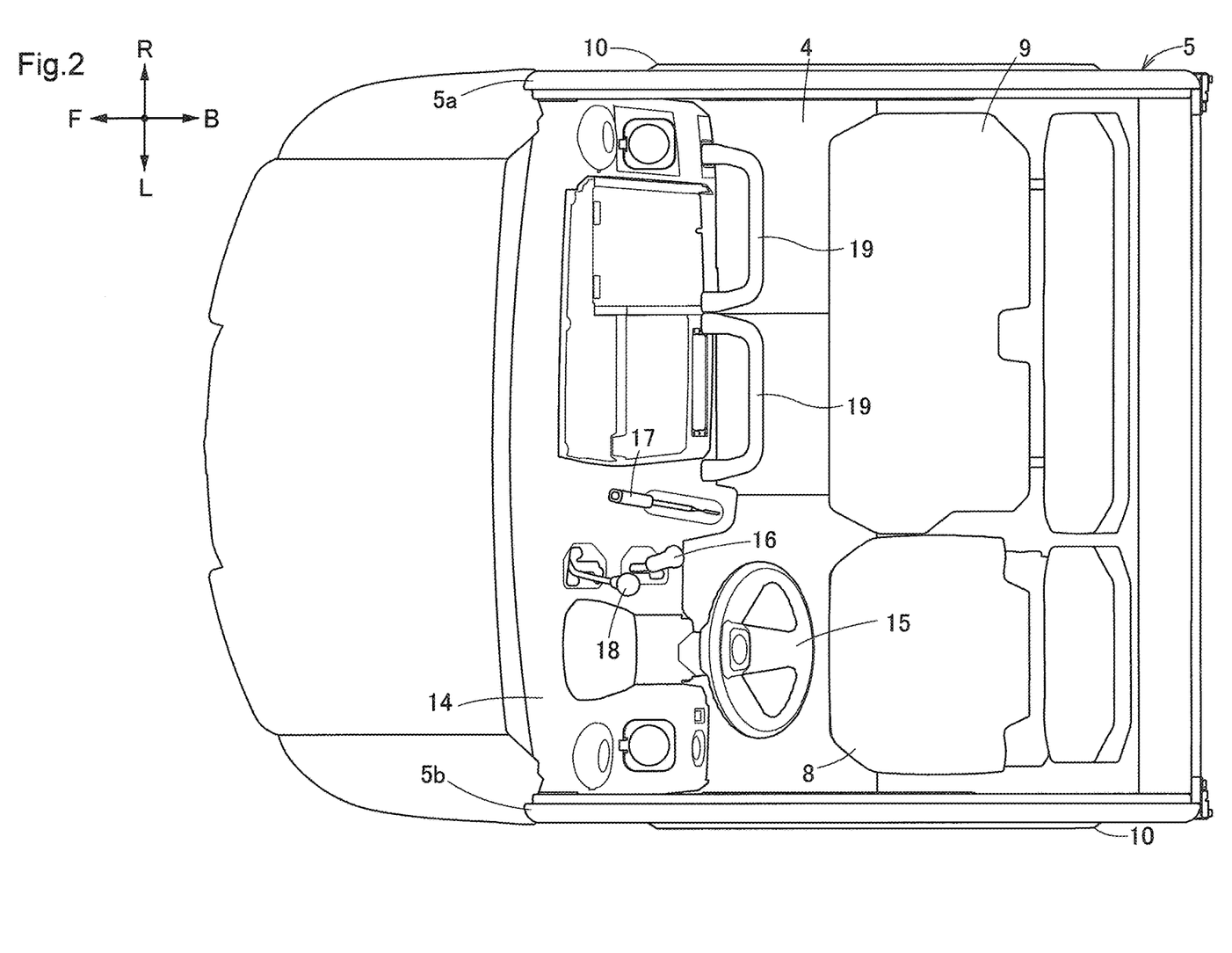
FIG. 2 is a plan view of a work vehicle.

As illustrated in FIGS. 1 and 2, the work vehicle includes a body 3, a pair of right and left front wheels 1 at a front portion of the body 3, and a pair of right and left rear wheels 2 at a back portion of the body 3 such that the front and rear wheels 1 and 2 support the body 3. The body 3 includes a floor frame 4, a roll-over protective structure (ROPS) frame 5, a back frame 6, and a lower frame 7. The front and rear wheels 1 and 2 correspond to the "travel device".

The floor frame 4 is at a lower portion of the body 3. The work vehicle includes a driver's seat 8 and a passenger's seat 9 arranged laterally on the floor frame 4. The ROPS frame 5 is coupled to the floor frame 4 in such a manner as to cover the driver's seat 8 and the passenger's seat 9. The passenger's seat 9 is approximately twice as wide as the driver's seat 8 to accommodate two occupants. The passenger's seat 9 corresponds to the "seat".

The work vehicle includes a pair of right and left doors 10 attached respectively to a right ROPS frame section 5a and left ROPS frame section 5b of the ROPS frame 5 in such a manner as to be openable and closable. The back frame 6 and the lower frame 7 are each coupled to a back portion of the ROPS frame 5 and extend backward. The work vehicle includes a carrier box 11 on the back frame 6.

Travel Power Transmission System

As illustrated in FIG. 1, the work vehicle includes an engine 12, a continuously variable transmission device 13, and a transmission case (not illustrated in the drawings) all disposed on the lower frame 7 as well as the rear wheels 2. The transmission case contains an auxiliary transmission device (not illustrated in the drawings), a rear-wheel differential device (not illustrated in the drawings), and a front-wheel power transmission device (not illustrated in the drawings). The auxiliary transmission device is a gear-based transmission device capable of shifting to three forward gears and one rearward gear.

The engine 12 transmits motive power to the continuously variable transmission device 13, which varies the motive power and transmits the resulting motive power to the auxiliary transmission device, which further varies the motive power and transmits the resulting motive power to the rear-wheel differential device, which transmits the motive power to the rear wheels 2. The auxiliary transmission device also transmits motive power through the front-wheel power transmission device, which serves as a branch from a position between the auxiliary transmission device and the rear-wheel differential device, to the front wheels 1.

Operating the front-wheel power transmission device for four-wheel drive causes the auxiliary transmission device to transmit motive power through the branch to the front wheels 1, so that the work vehicle is in the four-wheel drive mode, in which the front and rear wheels 1 and 2 are both driven.

Operating the front-wheel power transmission device for two-wheel drive causes the front-wheel power transmission device to block motive power, so that the work vehicle is in the two-wheel drive mode, in which only the rear wheels 2 are driven.

Support Frame 20 (Configuration 1)

Figure 3:
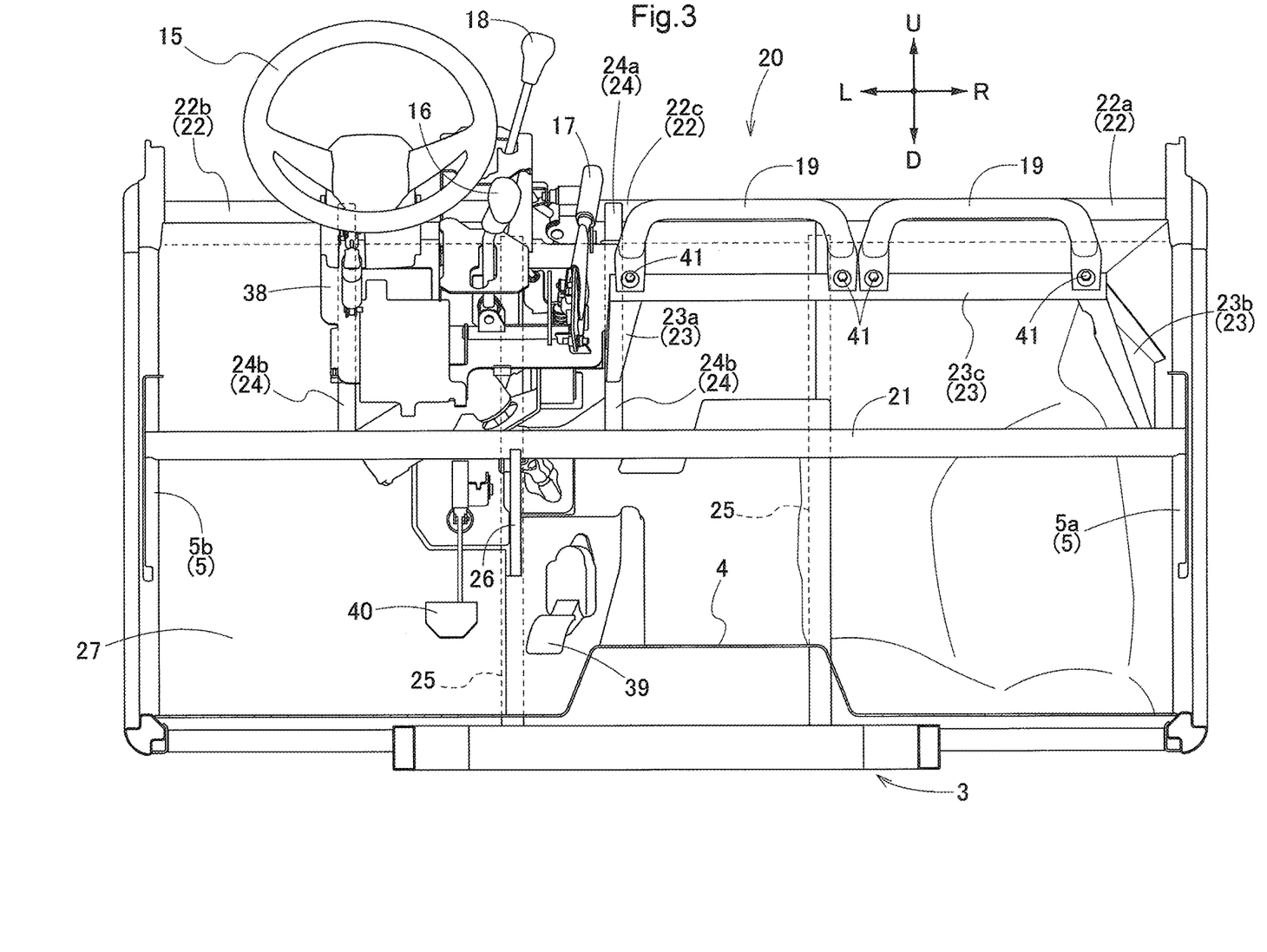
FIG. 3 is a rear view of a support frame and its surroundings.
Figure 4:
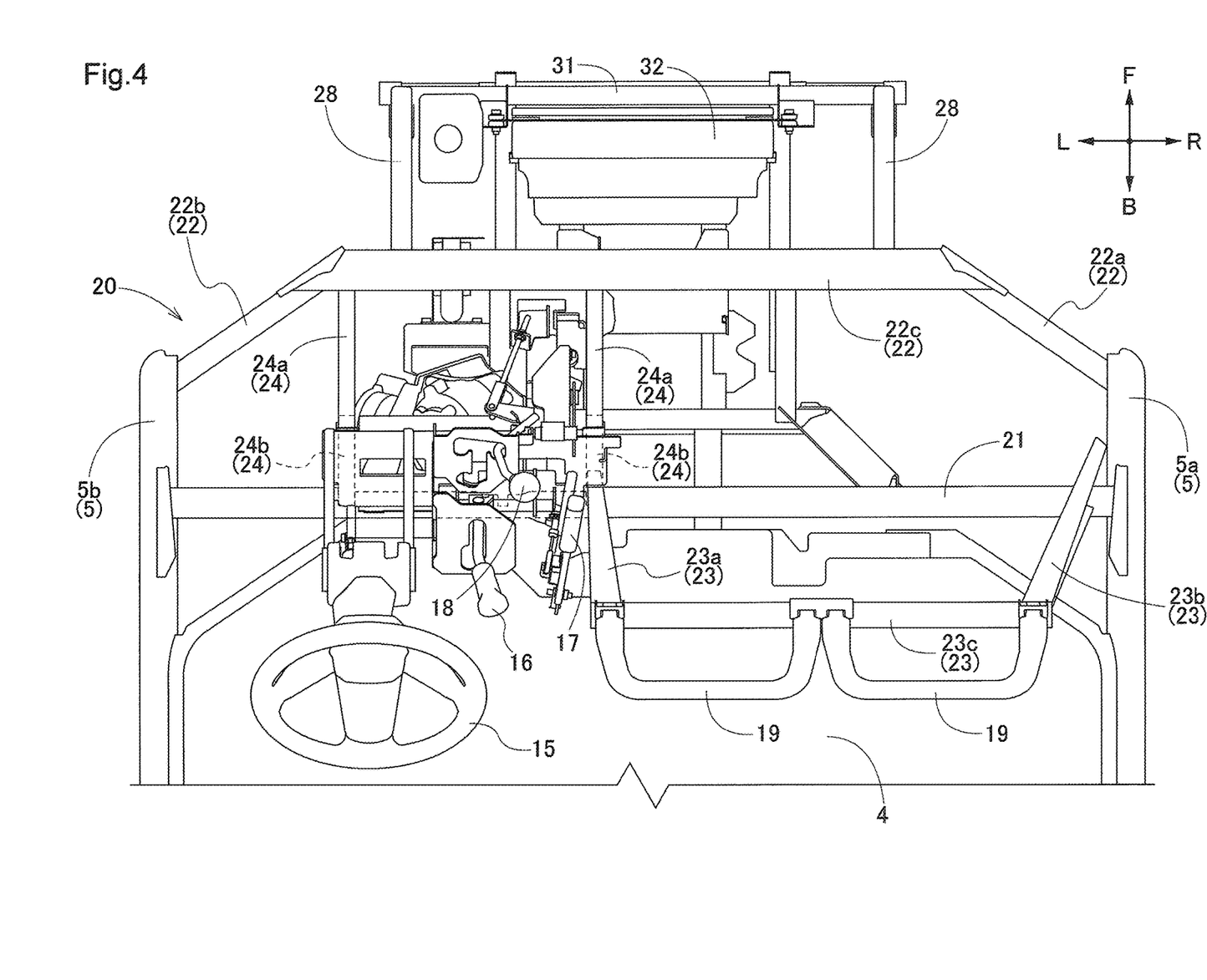
FIG. 4 is a plan view of a support frame and its surroundings.
Figure 5:
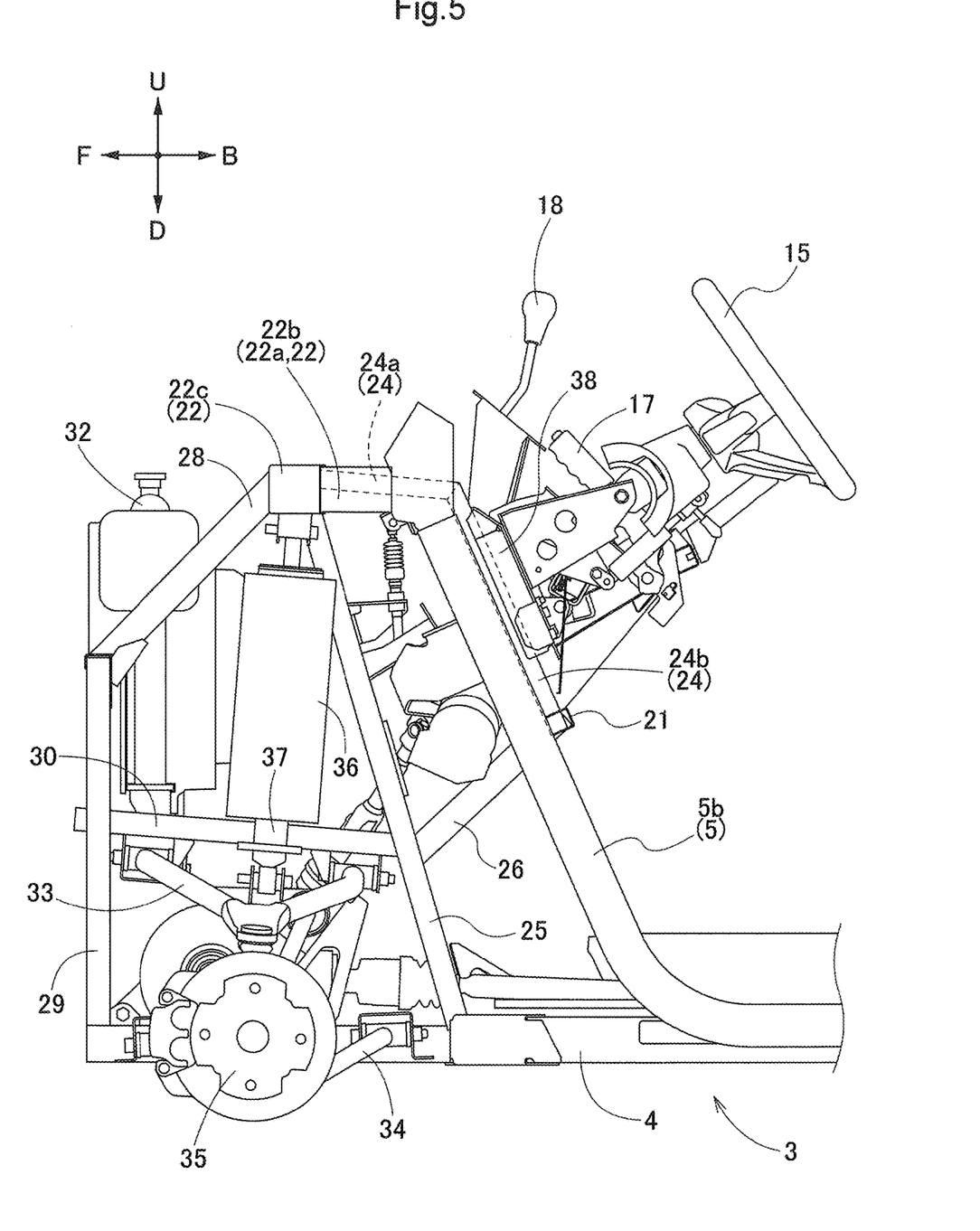
FIG. 5 is a left side view of a support frame and its surroundings.

As illustrated in FIGS. 3 to 5, the work vehicle includes a support frame 20 extending laterally, coupled to the right and left ROPS frame sections 5a and 5b, and positioned above the floor frame 4 and forward of the driver's seat 8 and the passenger's seat 9 (see FIGS. 1 and 2) relative to the body 3.

The support frame 20 includes a first lateral frame member 21, a second lateral frame member 22, a third lateral frame member 23, and a pair of right and left vertical frame members 24. The right and left ROPS frame sections 5a and 5b may be regarded respectively as a right section 5a and left section 5b of the body 3.

The first lateral frame member 21 is a straight member positioned above the floor frame 4. The first lateral frame member 21 extends laterally, is coupled to the right and left ROPS frame sections 5a and 5b, and is positioned forward of the driver's seat 8 and the passenger's seat 9 (see FIGS. 1 and 2).

The second lateral frame member 22 includes a right section 22a, a left section 22b, and a central section 22c. The right section 22a is coupled to the right ROPS frame section 5a and extends therefrom obliquely in a front-left direction in a plan view. The left section 22b is coupled to the left ROPS frame section 5b and extends therefrom obliquely in a front-right direction in a plan view. The central section 22c extends laterally and is coupled to respective front end portions of the right and left sections 22a and 22b.

With the above configuration, the second lateral frame member 22 is positioned above the first lateral frame member 21 and forward of the first lateral frame member 21 in a plan view. The second lateral frame member 22 extends laterally, is coupled to the right and left ROPS frame sections 5a and 5b, and is positioned forward of the driver's seat 8 and the passenger's seat 9 (see FIGS. 1 and 2).

Support Frame 20 (Configuration 2)

As illustrated in FIGS. 3 to 5, the vertical frame members 24 each include an upper section 24a and a lower section 24b. The lower section 24b extends vertically and has a lower portion coupled to a left portion of the first lateral frame member 21.

The upper section 24a extends in the front-back direction and has a front portion coupled to a left portion of the central section 22c of the second lateral frame member 22. The lower section 24b has an upper portion coupled to a back portion of the corresponding upper section 24a.

With the above configuration, the vertical frame members 24 are each bent at an angle in a side view. The vertical frame members 24 extend vertically, are coupled to the first and second lateral frame members 21 and 22, and are positioned forward of the driver's seat 8 (see FIGS. 1 and 2).

The third lateral frame member 23 includes a first section 23a, a second section 23b, and a third section 23c. The first section 23a is coupled to the lower section 24b of the right vertical frame member 24, and extends backward therefrom.

The second section 23b is coupled to the right ROPS frame section 5a (that is, a right portion 5a of the body 3 which right portion 5a faces the passenger's seat 9), and extends backward therefrom. The third section 23c extends laterally and is coupled to respective back portions of the first and second sections 23a and 23b.

The third lateral frame member 23 is positioned forward of the driver's seat 8 and the passenger's seat 9 (see FIGS. 1 and 2). The third lateral frame member 23 is, in a rear view, positioned between the first and second lateral frame members 21 and 22, above the first lateral frame member 21, and below the second lateral frame member 22.

Surroundings of Support Frame 20

As illustrated in FIGS. 3 to 5, the floor frame 4 extends further forward than the support frame 20 (specifically, than the second lateral frame member 22).

The work vehicle includes a pair of right and left vertical frame members 25 coupled to respective right and left portions of the central section 22c of the second lateral frame member 22 and the floor frame 4. The vertical frame members 25 are forward of the ROPS frame 5 and the first lateral frame member 21 in a side view. The work vehicle includes a longitudinal frame member 26 coupled to a left portion of the first lateral frame member 21 and a vertically intermediate portion of the left vertical frame member 25.

The work vehicle includes a front panel 27 attached to a front portion of the floor frame 4, the right and left ROPS frame sections 5a and 5b, the second lateral frame member 22, and the vertical frame members 25. The front panel 27 separates a backward area of the support frame 20 (that is, the area of the driver's seat 8 and the passenger's seat 9) from a forward area thereof.

The work vehicle includes a pair of right and left vertical front frame members 28 coupled to respective right and left portions of the central section 22c of the second lateral frame member 22 and extending therefrom obliquely in a lower-front direction. The work vehicle includes a pair of right and left vertical front frame members 29 coupled to a front end portion of the floor frame 4 and extend upward therefrom. The front frame members 28 each have a lower end portion coupled to an upper end portion of the corresponding front frame member 29.

The work vehicle includes (i) a pair of right and left longitudinal frame members 30 coupled to respective vertically intermediate portions of the corresponding vertical frame member 25 and the corresponding front frame member 29, (ii) a lateral frame member 31 coupled to the front frame members 29, and (iii) a radiator 32 attached to the longitudinal frame members 30 and the lateral frame member 31.

How Front Wheels 1 are Held

As illustrated in FIG. 5, the work vehicle includes (i) a pair of right and left upper arms 33 attached to the respective longitudinal frame members 30 in such a manner as to be swingable upward and downward, (ii) a pair of right and left lower arms 34 attached to a front portion of the floor frame 4 in such a manner as to be swingable upward and downward, (iii) a pair of right and left knuckles (not illustrated in the drawings) attached to the respective upper arms 33 and the respective lower arms 34, and (iv) a pair of right and left hubs 35 attached to the respective knuckles. The front wheels 1 (see FIG. 1) are attached to the respective hubs 35.

The work vehicle includes a pair of right and left suspension springs 36 and a pair of right and left shock absorbers 37. The suspension springs 36 and the shock absorbers 37 each have a lower portion attached to the corresponding upper arm 33 and an upper portion attached to a corresponding one of (i) a portion at which the right section 22a and the central section 22c of the second lateral frame member 22 are coupled to each other or (ii) a portion at which the left section 22b and the central section 22c of the second lateral frame member 22 are coupled to each other.

As described above, the work vehicle includes a double wishbone suspension mechanism made up of such components as the upper arms 33, the lower arms 34, the knuckles, the hubs 35, the suspension springs 36, and the shock absorbers 37.

Operation Panel 14 and its Surroundings

As illustrated in FIGS. 3 to 5, the work vehicle includes a substrate 38 attached to the lower section 24b of each vertical frame member 24. The work vehicle includes a steering wheel 15, a shift lever 16, a parking brake lever 17, and a switching lever 18 each attached to the substrate 38.

With the above configuration, the steering wheel 15, the shift lever 16, the parking brake lever 17, and the switching lever 18 are attached to the support frame 20 (specifically, the lower section 24b of each vertical frame member 24) with the substrate 38 in-between, and are positioned forward of the driver's seat 8 (see FIGS. 1 and 2).

As illustrated in FIGS. 1 and 2, the work vehicle includes an operation panel 14 made of synthetic resin, having two or more openings, and attached to the support frame 20. The steering wheel 15, the shift lever 16, the parking brake lever 17, and the switching lever 18 each extend through the corresponding opening out of the operation panel 14. As illustrated in FIG. 3, the work vehicle includes an accelerator pedal 39 and a brake pedal 40 below a left portion of the operation panel 14.

The continuously variable transmission device 13 is a belt-based transmission device. Pushing the accelerator pedal 39 increases the number of revolutions of the engine 12, which in turn automatically operates the continuously variable transmission device 13 toward the high-speed side. Letting the accelerator pedal 51 return to its original position decreases the number of revolutions of the engine 12, which in turn automatically operates the continuously variable transmission device 13 toward the low-speed side.

The steering wheel 15 is for use to turn the front wheels 1. The shift lever 16 is for use to operate the auxiliary transmission device in the transmission case for a shift to three forward gears and one rearward gear. The switching lever 18 is for use to operate the front-wheel power transmission device for four-wheel drive or two-wheel drive.

The work vehicle includes brakes (not illustrated in the drawings) engageable on the front and rear wheels 1 and 2. Pushing the brake pedal 40 activates the brakes. Operating the parking brake lever 17 after pushing the brake pedal 40 and activating the brakes keeps the brakes activated.

Auxiliary Handles 19

As illustrated in FIGS. 2 to 4, the work vehicle includes two auxiliary handles 19 arranged laterally at a central portion and right portion, respectively, of the operation panel 14 and forward of the passenger's seat 9. The auxiliary handles 19 are as molded with use of the same mold and of the same size and shape. Two occupants on the passenger's seat 9 are each able to hold the corresponding auxiliary handle 19 with a hand.

The operation panel 14 is attached to the third section 23c of the third lateral frame member 23 from backward (or from outward). The auxiliary handles 19 are attached to a portion of the outer face of the operation panel 14 from backward (or from outward) which portion corresponds to the third section 23c.

The auxiliary handles 19 are each fastened to the third section 23c of the third lateral frame member 23 with use of bolts 41 with the operation panel 14 between the third section 23c and the auxiliary handles 19.

With the above configuration, the operation panel 14 is attached to the third lateral frame member 23, whereas the auxiliary handles 19 are arranged laterally and attached to the third section 23c.

First Alternative Embodiment

The embodiment described above may be altered such that the driver's seat 8 is at a right portion of the floor frame 4 and that the passenger's seat 9 is to the left of the driver's seat 8.

The above alternative embodiment is configured such that the support frame 20 includes a pair of right and left vertical frame members 24 each coupled to respective right portions of the first and second lateral frame members 21 and 22 and a third lateral frame member 23 coupled to the left vertical frame member 24 and the left ROPS frame section 5b, that the steering wheel 15 is attached to each vertical frame member 24, and that the steering wheel 15 and the vertical frame members 24 are positioned forward of the driver's seat 8.

Second Alternative Embodiment

The embodiment described above may be altered such that the substrate 38 is attached not to each vertical frame member 24 but to the first and second lateral frame members 21 and 22.

This alternative embodiment is configured such that the steering wheel 15 is attached to the first and second lateral frame members 21 and 22 with the substrate 38 in-between.

Third Alternative Embodiment

The embodiment described above may be altered to include (i) a left longitudinal frame member 26 coupled to a left portion of the first lateral frame member 21 and a vertically intermediate portion of the left vertical frame member 25 and (ii) a right longitudinal frame member 26 coupled to a right portion of the first lateral frame member 21 and a vertically intermediate portion of the right vertical frame member 25.

Fourth Alternative Embodiment

The embodiment described above may be altered such that the vertical frame members 24 are each not bent at an angle but straight members in a side view.
The work vehicle includes:
 a body 3;
 a travel device (that is, the front and rear wheels 1 and 2) attached to and supporting the body 3;
 a driver's seat 8 on the body 3;
 a passenger's seat 9 on the body 3 and lateral to the driver's seat 8;
 a support frame 20 positioned above a lower portion (that is, the floor frame 4) of the body 3, extending laterally, and coupled to a pair of right and left sections 5a and 5b of the body 3 which right and left sections 5a and 5b are forward of the driver's seat 8 and the passenger's seat 9; and
 a steering wheel 15 manually operable by a driver on the driver's seat 8 to steer the work vehicle, the steering wheel 15 is attached to the support frame 20,
the support frame 20 including:
 a first lateral frame member 21 positioned above the lower portion (that is, the floor frame 4) of the body 3, extending laterally, and coupled to the right and left sections 5a and 5b of the body 3;
 a second lateral frame member 22 positioned above the first lateral frame member, 21 extending laterally, and coupled to the right and left sections 5a and 5b of the body 3; and
 a first vertical frame member 24 extending vertically and coupled to the first lateral frame member 21 and the second lateral frame member 22.

The work vehicle may be configured such that
 the first vertical frame member 24 is forward of the driver's seat 8, and the steering wheel 15 is attached to the first vertical frame member 24.
The work vehicle may be configured such that
 the second lateral frame member 22 is forward of the first lateral frame member 21, and
 the first vertical frame member 24 includes:
  a lower section 24b extending vertically and having a lower portion coupled to the first lateral frame member 21; and
  an upper section 24a extending in a front-back direction and having a front portion coupled to the second lateral frame member 22, and
 the lower section 24b has an upper portion coupled to a back portion of the upper section 24.
The work vehicle may be further configured such that
 the steering wheel 15 is attached to the lower section 24b.
The work vehicle may be configured such that
 the body 3 includes:
  a floor frame 4 at a lower portion of the body 3; and
  a roll-over protective structure frame 5 coupled to the floor frame 4 and covering the driver's seat 8 and the passenger's seat 9,
 the first lateral frame member 21 is positioned above the floor frame 4, extends laterally, and is coupled to a pair of right and left sections 5a and 5b of the roll-over protective structure frame 5 which right and left sections 5a and 5b are forward of the driver's seat 8 and the passenger's seat 9, and
 the second lateral frame member 22 is positioned above the first lateral frame member 21, extends laterally, and is coupled to the right and left sections 5a and 5b of the roll-over protective structure frame 5.
The work vehicle may be configured such that
 the body 3 includes a floor frame 4 at a lower portion of the body 3, and
 the work vehicle further includes a second vertical frame member 25 extending vertically and coupled to the second lateral frame member 22 and the floor frame 4.
The work vehicle may be further configured such that
 the second vertical frame member 25 is forward of the first lateral frame member 21, and
 the work vehicle further includes a longitudinal frame member 26 extending in a front-back direction and coupled to the first lateral frame member 21 and the second vertical frame member 25.
The work vehicle may further include
 a third lateral frame member 23 forward of the driver's seat 8 and the passenger's seat 9 relative to the body 3, extending laterally, and coupled to the first vertical frame member 24 and that one of the right and left sections 5a and 5b of the body 3 which faces the passenger's seat 9.
The work vehicle may be further configured such that
 the third lateral frame member 23 is above the first lateral frame member 21 and below the second lateral frame member 22.

INDUSTRIAL APPLICABILITY

The present invention is applicable not only to work vehicles including front wheels 1 and rear wheels 2, but also to work vehicles including front wheels 1 and rear crawler travel devices (not illustrated in the drawings) and to work vehicles including a pair of right and left crawler travel devices instead of front and rear wheels 1 and 2.

REFERENCE SIGNS LIST

1 Front wheel (travel device)
2 Rear wheel (traveling device)
3 Body
4 Floor frame
5 ROPS frame
5a Right section
5b Left section
8 Driver's seat
9 Passenger's seat
15 Steering wheel
20 Support frame
21 First lateral frame member
22 Second lateral frame member
23 Third lateral frame member
24 Vertical frame member
24a Upper section
24b Lower section
25 Vertical frame member
26 Longitudinal frame member

The invention claimed is:

1. A work vehicle, comprising:
a body;
a travel device attached to and supporting the body;
a driver's seat on the body;
a passenger's seat on the body and lateral to the driver's seat;
a steering wheel manually operable by a driver on the driver's seat to steer the work vehicle; and
a support frame positioned above a lower portion of the body, extending laterally, and coupled to a pair of right and left sections of the body which right and left sections are forward of the driver's seat and the passenger's seat,
wherein the steering wheel is attached to the support frame, and
wherein the support frame comprises:
a first lateral frame member positioned above the lower portion of the body, extending laterally, and coupled to the right and left sections of the body;
a second lateral frame member positioned above the first lateral frame member, extending laterally, and coupled to the right and left sections of the body; and
a first vertical frame member extending vertically and coupled to the first lateral frame member and the second lateral frame member,
wherein the first vertical frame member is forward of the driver's seat, and
the steering wheel is attached to the first vertical frame member, and
wherein the work vehicle further comprises a third lateral frame member forward of the driver's seat and the passenger's seat relative to the body, extending laterally, and coupled to the first vertical frame member and one of a right end portion and a left end portion of the body which faces the passenger's seat.

2. The work vehicle according to claim 1, wherein:
the third lateral frame member is above the first lateral frame member and below the second lateral frame member.

3. The work vehicle according to claim 1, wherein:
the second lateral frame member is forward of the first lateral frame member, the first vertical frame member comprises:
a lower section extending vertically and having a lower portion coupled to the first lateral frame member; and
an upper section extending in a front-back direction and having a front portion coupled to the second lateral frame member, and
the lower section has an upper portion coupled to a back portion of the upper section.

4. The work vehicle according to claim 3, wherein:
the first vertical frame member is forward of the driver's seat, and
the steering wheel is attached to the lower section.

5. The work vehicle according to claim 1, wherein:
the body comprises:
a floor frame at a lower portion of the body; and
a roll-over protective structure frame coupled to the floor frame and covering the driver's seat and the passenger's seat,
the first lateral frame member is positioned above the floor frame, extends laterally, and is coupled to a pair of right and left sections of the roll-over protective structure frame which right and left sections are forward of the driver's seat and the passenger's seat, and
the second lateral frame member is positioned above the first lateral frame member, extends laterally, and is coupled to the right and left sections of the roll-over protective structure frame.

6. The work vehicle according to claim 1, wherein:
the body comprises a floor frame at a lower portion of the body, and
the work vehicle further comprises a second vertical frame member extending vertically and coupled to the second lateral frame member and the floor frame.

7. The work vehicle according to claim 6, wherein:
the second vertical frame member is forward of the first lateral frame member, and
the work vehicle further comprises a longitudinal frame member extending in a front-back direction and coupled to the first lateral frame member and the second vertical frame member.

8. A work vehicle, comprising:
a body;
a travel device attached to and supporting the body;
a driver's seat on the body;
a passenger's seat on the body and lateral to the driver's seat;
a steering wheel manually operable by a driver on the driver's seat to steer the work vehicle; and
a support frame positioned above a lower portion of the body, extending laterally, and coupled to a pair of right and left sections of the body which right and left sections are forward of the driver's seat and the passenger's seat,
wherein the steering wheel is attached to the support frame, and
wherein the support frame comprises:
a first lateral frame member positioned above the lower portion of the body, extending laterally, and coupled to the right and left sections of the body;
a second lateral frame member positioned above the first lateral frame member, extending laterally, and coupled to the right and left sections of the body; and
a first vertical frame member extending vertically and coupled to the first lateral frame member and the second lateral frame member, wherein the second lateral frame member is forward of the first lateral frame member, the first vertical frame member comprises:
  a lower section extending vertically and having:
    a lower portion coupled to the first lateral frame member, and
    an upper portion inclined forward; and
  an upper section extending in a front-back direction and having a front portion coupled to the second lateral frame member, and
the upper portion of the lower section coupled to a back portion of the upper section.

9. A work vehicle, comprising:
a body;
a travel device attached to and supporting the body;
a driver's seat on the body;
a passenger's seat on the body and lateral to the driver's seat;
a steering wheel manually operable by a driver on the driver's seat to steer the work vehicle; and
a support frame positioned above a lower portion of the body, extending laterally, and coupled to a pair of right and left sections of the body which right and left sections are forward of the driver's seat and the passenger's seat,
wherein the steering wheel is attached to the support frame, and
wherein the support frame comprises:
  a first lateral frame member positioned above the lower portion of the body, extending laterally, and coupled to the right and left sections of the body;
  a second lateral frame member positioned above the first lateral frame member, extending laterally, and coupled to the right and left sections of the body; and
  a first vertical frame member extending vertically and coupled to the first lateral frame member and the second lateral frame member,
wherein the body comprises a floor frame at a lower portion of the body, and the work vehicle further comprises a second vertical frame member extending vertically and coupled to the second lateral frame member and the floor frame, and
wherein the second vertical frame member is forward of the first lateral frame member, and
the work vehicle further comprises a longitudinal frame member extending in a front-back direction and coupled to the first lateral frame member and the second vertical frame member.

10. A work vehicle, comprising:
a body;
a travel device attached to and supporting the body;
a driver's seat on the body;
a passenger's seat on the body and lateral to the driver's seat;
a steering wheel manually operable by a driver on the driver's seat to steer the work vehicle; and
a support frame positioned above a lower portion of the body, extending laterally, and coupled to a pair of right and left sections of the body which right and left sections are forward of the driver's seat and the passenger's seat,
wherein the steering wheel is attached to the support frame, and
wherein the support frame comprises:
  a first lateral frame member positioned above the lower portion of the body, extending laterally, and coupled to the right and left sections of the body;
  a second lateral frame member positioned above the first lateral frame member, extending laterally, and coupled to the right and left sections of the body; and
  a pair of first vertical frame members extending vertically and coupled to the first lateral frame member and a central section of the second lateral frame member on opposing sides of a substrate,
wherein the steering wheel, a shift lever, a parking break lever, and a switching lever are attached to the substrate.

* * * * *